UNITED STATES PATENT OFFICE.

CHARLES A. CATLIN, OF PROVIDENCE, RHODE ISLAND.

ACID PHOSPHATE FOR BAKING-POWDERS.

SPECIFICATION forming part of Letters Patent No. 229,518, dated July 6, 1880.

Application filed February 27, 1879.

*To all whom it may concern:*

Be it known that I, CHARLES A. CATLIN, of Providence, in the county of Providence and State of Rhode Island, have invented a new and useful Improvement in Cream-of-Tartar Substitutes, being a hydrogen dicalcic phosphate, which improvement is fully set forth in the following specification.

This invention relates to that class of compounds known as "cream-of-tartar substitutes," "baking-powders," or "self-raising flour," in which the active acid ingredient is an acid phosphate of lime derived from tricalcic phosphate.

According to the method now in common use for preparing the above referred to cream-of-tartar substitutes, white bone-ash is treated with oil of vitriol diluted with an equal volume of water without the application of artificial heat longer or other than that developed by the chemical action.

Before the completion of the decomposition has taken place, the mass assumes an apparently dry condition. It is then treated artificially to remove thoroughly all contained moisture and ground. The article so produced, however, gradually loses its acid strength. Baking-powders made with such, by admixture with a bicarbonate of soda or potassa in a dry state, do not retain their virtues for any great length of time.

The object of my invention is to produce an acid powder that will not deteriorate on keeping, and that will admit of being mixed with a bicarbonate of soda or potassa in a dry state without combining with it, and which shall at the same time retain all of its active properties in such admixture, provided it be kept dry.

The objections to the old method are, first, that by it only a partial decomposition of the tricalcic phosphate is possible, and even though sufficient lime-base be present the first reaction of the oil of vitriol upon the bone-ash develops an acid phosphate having but a small amount of the lime-base, and evolves so much heat as to drive off even the small amount of water present, rendering it impossible for the acid phosphate to acquire a further amount of base, even though the heat were sufficient for that slow reaction; second, another and one of the strongest objections to the old method is, that by reason of the small amount of water, and its dissipation by the heat of the reaction before crystallization has taken place, the sulphate of lime is but partially hydrated, if at all, and a gradual loss of the acid strength takes place in the compound, the ortho-phosphate losing its combined water through a gradual hydration of the sulphate of lime, and becoming a meta-phosphate of lime.

The invention based on these facts and discoveries consists in an acid powder or cream-of-tartar substitute in which the active acid ingredient shall be an acid phosphate of lime containing more, or at least as much, of the lime-base as a dihydrogen calcic phosphate, and approaching toward a hydrogen dicalcic phosphate, and in which the phosphoric-acid salts and the sulphate of lime present shall exist in a completely hydrated condition.

It consists, also, in the use of this product or acid powder in baking-powder or bread-making, in combination with alkaline carbonates.

The invention consists, further, in the process or method of making the said acid powder.

The following description will enable those skilled in the art to make and use my invention.

In a suitable tank provided with an agitator and steam-coil, or other means of effectually heating the contents, I place one hundred and twenty gallons of acid phosphate of lime solution at 15° Baumé, (obtained by treating bone-black or other tribasic phosphate with oil of vitriol,) and fourteen hundred and forty pounds of dilute oil of vitriol (sulphuric acid) standing 34° Baumé, from which the lead has been removed, (or equivalent quantity of greater dilution,) and a volume of water equal to both of these. Set the agitator in motion and apply heat. I now gradually add seven hundred and ten pounds of powdered white bone-ash. The whole is kept in motion at a boiling, or nearly boiling, temperature for from four to six hours, when, under ordinary circumstances, the decomposition will be complete. I now add to the fluid mass, motion and heat being still continued, a further quantity of finely-powdered white bone-ash—say about four hundred and thirty-six pounds—which will be sufficient to produce a portion of hydrogen dicalcic phosphate.

This final reaction occupies from five to six hours; but the time required for its completion depends largely upon the degree of comminution of the bone-ash. It is possible and practicable to accomplish the same result by adding the whole amount of the bone-ash at the outset, and continuing the agitation and heat from eighteen to twenty hours, although I prefer making two stages of the process, for I find the ease of manipulation and resulting product much more satisfactory.

I would remark here, that in the treatment in the agitator it is not advisable to reduce the total volume by boiling, so that the strength of the vitriol is increased; but any such reduction of volume by the boiling should be supplied by additions of water.

When the decomposition is complete the hot thick fluid mass is withdrawn from the agitating-tank into shallow crystallizing-vats, or, better, thrown upon a tight floor, where it is allowed to remain until it has assumed a pasty or nearly solid condition, being broken up meanwhile from time to time. It is now spread upon the floor or other convenient place until it becomes crystalline and almost dry, at which time it is taken and reduced to a granular condition, and the drying process completed in a current of dry or heated dry air. If heat is used care must be taken not to subject it to too high a temperature. I have found, however, that a heat of 120° Fahrenheit will not impair its quality. After grinding and bolting the product is complete.

Instead of employing an acid-phosphate solution at the start I may add to dilute oil of vitriol, say, three thousand two hundred pounds, of 1.195 specific gravity, powdered white bone-ash, sufficient to form therewith dihydrogen calcic phosphate in solution—say one thousand pounds bone-ash. Keep the whole in motion, at a boiling or nearly boiling temperature from seven to ten hours; then add (motion and heat being continued) additional white bone-ash—about six hundred and thirty pounds—sufficient to combine with the dihydrogen calcic phosphate, which reaction will take place in five or six hours, and then proceed as before. The product is similar to the first.

It is also, as I have found, possible and practicable to effect the conversion of the dihydrogen calcic phosphate produced in the first decomposition into hydrogen dicalcic phosphate by substituting for the last-added portion of bone-ash the requisite quantity of powdered carbonate of lime or powdered quicklime. To effect such a reaction when a carbonate is so used, it must be added very gradually to the hot or boiling mass, and time and space given for the evolution of the carbonic-acid gas. In this case the completion of the process is indicated when such evolution ceases. The resulting product is not, however, so desirable as that produced by the before-described process.

Should it be desired to obtain a hydrogen dicalcic phosphate compound without the sulphate of lime resulting from the decomposition of the tricalcic phosphate, as described above, it may be readily accomplished by filtering off the hydrogen dicalcic phosphate solution resulting from the final reaction, as shown above, from the insoluble sulphate of lime, and concentrating to the point of crystallization, reducing it to the required acid strength with starch or other diluent, and drying at a low temperature, not above 120° Fahrenheit. In this case the bone-black may be substituted in equivalent proportion for the bone-ash, and the acid-phosphate solution replaced by water.

I do not confine myself to the exact weights of material, nor to the strength of the dilute oil of vitriol set forth in the above description, as, within certain limits, these may be varied to suit either convenience or required acid strength of the product; but I prefer to use these here given, since with them I have obtained satisfactory results.

I combine the acid powder with alkaline carbonates for making baking-powders in the manner well known to manufacturers thereof, and also use the said acid powder as a substitute for cream-tartar or other acid salts in bread-making or self-raising flour, in combination with alkaline carbonates.

I append a carefully-made analysis of the product obtained by treating bone-ash with oil of vitriol diluted with excess of water under agitation and heat, substantially as hereinbefore set forth:

| | |
|---|---|
| Phosphoric acid | 27.52 |
| Lime | 27.33 |
| Sulphuric acid | 22.60 |
| Water of crystallization | 22.54 |
| | 100.00 |

Decomposition of the bone-ash perfect, and hydration of sulphate of lime complete.

It is obvious that the results of different analyses may vary among themselves, but the above is considered substantially correct.

Having thus fully described my invention, and the manner in which the same is or may be carried into effect, what I claim, and desire to secure by Letters Patent, is—

1. The process of manufacturing an acid powder by the treatment of bone-ash with dilute oil of vitriol and a solution of same, acid phosphate of lime, with large excess of water, and the application of heat, as and for the purposes specified.

2. In the manufacture of an acid powder or cream-of-tartar substitute, the method of insuring the complete hydration of the phosphoric-acid salts and the sulphate of lime present by treating the bone-ash or other tricalcic phosphate with oil of vitriol diluted with an excess of water under agitation and heat, substantially as described.

3. The process of manufacturing an acid powder or cream-of-tartar substitute, consisting in treating bone-ash with oil of vitriol diluted with excess of water under agitation and heat, and converting the dihydrogen calcic phosphate formed into hydrogen dicalcic phosphate by the combination, with additional elements, of base, substantially as described.

4. The acid phosphate or cream-of-tartar substitute, in which the active ingredient has an excess of base over a dihydrogen calcic phosphate, and in which both the phosphoric-acid salts and the sulphate of lime present are completely hydrated, substantially as described.

In testimony whereof I have signed this specification in the presence of two subscribing witnesses.

CHAS. A. CATLIN.

Witnesses:
G. M. CARPENTER, Jr.,
PHILIP O'REILLY.